United States Patent
Hoehmann et al.

(10) Patent No.: US 9,726,346 B2
(45) Date of Patent: Aug. 8, 2017

(54) LIGHT MODULE AND METHOD FOR GENERATING WAVELENGTH-CONVERTED LIGHT IN THE RED SPECTRAL RANGE, AND METHOD FOR PROVIDING A WAVELENGTH CONVERSION ELEMENT

(71) Applicant: OSRAM GmbH, Munich (DE)

(72) Inventors: Peter Hoehmann, Berlin (DE); Oliver Mehl, Berlin (DE)

(73) Assignee: Osram GmbH, Munich (DE)

( * ) Notice: Subject to any disclaimer, the term of this patent is extended or adjusted under 35 U.S.C. 154(b) by 434 days.

(21) Appl. No.: 14/331,245

(22) Filed: Jul. 15, 2014

(65) Prior Publication Data
US 2015/0049456 A1    Feb. 19, 2015

(30) Foreign Application Priority Data
Aug. 13, 2013  (DE) ........................ 10 2013 215 981

(51) Int. Cl.
| | |
|---|---|
| *G03B 21/14* | (2006.01) |
| *F21V 9/08* | (2006.01) |
| *F21V 14/08* | (2006.01) |
| *H04N 9/31* | (2006.01) |
| *G03B 21/20* | (2006.01) |
| *G03B 33/08* | (2006.01) |

(52) U.S. Cl.
CPC ................ *F21V 9/08* (2013.01); *F21V 14/08* (2013.01); *G03B 21/204* (2013.01); *G03B 33/08* (2013.01); *H04N 9/3158* (2013.01)

(58) Field of Classification Search
CPC .......... F21V 9/08; F21V 14/08; F21S 10/007; G03B 21/204; G03B 33/08
USPC ........................................................ 362/231
See application file for complete search history.

(56) References Cited

U.S. PATENT DOCUMENTS

| | | | |
|---|---|---|---|
| 7,854,514 B2* | 12/2010 | Conner ................ | G02B 27/283 353/121 |
| 2014/0176914 A1* | 6/2014 | Mueller ................ | F21S 10/007 353/31 |

* cited by examiner

*Primary Examiner* — Anabel Ton
(74) *Attorney, Agent, or Firm* — Viering, Jentschura & Partner mbB

(57) ABSTRACT

A light module includes a wavelength conversion element and an excitation radiation source to emit excitation radiation having the first wavelength and arranged such that excitation radiation emitted by the excitation radiation source can be radiated onto the wavelength conversion element. The element has an emission spectrum having a red spectral component and a second dominant wavelength, which is less than a first dominant wavelength of the wavelength spectrum of the light to be generated by a predefinable value. The light module includes a long-pass filter arranged such that light emitted by the element can be radiated onto the long-pass filter. The long-pass filter is designed to filter the light emitted by the element and radiated onto the long-pass filter such that the filtered light has the wavelength spectrum of the light to be generated having the predefinable dominant wavelength.

12 Claims, 11 Drawing Sheets

| | RL | GL | GGL1 |
|---|---|---|---|
| $\lambda_D$ [nm] | 600.8 | 568.4 | 600.2 |
| $\phi_e$ [W] | 1.49 | 3.90 | 1.46 |
| $\eta$ [lm/W] | 194 | 478 | 294 |
| $\phi_v$ [lm] | 289 | 1864 | 429 |
| $\phi_v$ [%] | 100 | | 148 |

LIGHT MODULE AND METHOD FOR GENERATING WAVELENGTH-CONVERTED LIGHT IN THE RED SPECTRAL RANGE, AND METHOD FOR PROVIDING A WAVELENGTH CONVERSION ELEMENT

CROSS-REFERENCE TO RELATED APPLICATION

This application claims priority to German Patent Application Serial No. 10 2013 215 981.1, which was filed Aug. 13, 2013, and is incorporated herein by reference in its entirety.

TECHNICAL FIELD

Various embodiments relate generally to a light module for generating wavelength-converted light in the red spectral range by means of a wavelength conversion element, and a method for generating wavelength-converted light in the red spectral range, and a method for providing a wavelength conversion element.

BACKGROUND

The prior art discloses light modules and methods for generating wavelength-converted light by means of wavelength conversion elements, such as phosphors, for example, in which excitation light, for example monochromatic light from a laser diode, is radiated onto the phosphor and the latter emits light having a converted, usually higher, wavelength. In the case of phosphors, as is known the problem occurs that they exhibit a decrease in the conversion efficiency with an increase in the pump power and pump power density of the excitation light. An increase in the pump power leads to an increase in the average temperature and, by way of the temperature dependence of the conversion efficiency, to a saturation of the output power (thermal quenching). A further cause that leads to a saturation of an output power in the event of an increase in the pump power density is intensity quenching, that is to say that a reduced population density of the lower pump level of the phosphor occurs on account of the long lifetime of the involved activator states of the phosphor. There is also a further problem in that these effects, such as thermal quenching and intensity quenching, are manifested to different extents in the case of different phosphors. Especially red phosphors exhibit a very great reduction of the conversion efficiency in the event of an increase in the pump power.

FIG. 1 shows, in a schematic illustration of a diagram, the dependence of the radiation power $\Phi_e$, that is to say the converted output power, on the pump power $P_P$ for a yellow phosphor 10, a green phosphor 11 and a red phosphor 12 for an identical excited phosphor area. As can be discerned, in this case the conversion efficiency of the red phosphor 12 is significantly lower than that of the yellow phosphor 10 and of the green phosphor 11. Furthermore, it can also be discerned that the conversion efficiency of the red phosphor 12 decreases to a significantly greater extent than that of the yellow phosphor 10 and of the green phosphor 11 as the pump power $P_P$ increases.

In the case of light modules, such as projectors, for example, in which different phosphors are used for generating e.g. green, yellow and red light, the limitation of the pump power in the red channel leads to a lower red luminous flux, which limits the total luminous flux of the projectors or adversely influences the white point. The prior art currently furthermore involves the use of red phosphors with as little thermal quenching as possible. However, these red phosphors then have a short dominant wavelength in the orange-red range that leads to a reduction of the size of the addressable color space. However, alternatively available LEDs for the red channel having a longer dominant wavelength likewise limit the total luminous flux in hybrid projectors on account of their low luminance.

SUMMARY

A light module includes a wavelength conversion element and an excitation radiation source to emit excitation radiation having the first wavelength and arranged such that excitation radiation emitted by the excitation radiation source can be radiated onto the wavelength conversion element. The element has an emission spectrum having a red spectral component and a second dominant wavelength, which is less than a first dominant wavelength of the wavelength spectrum of the light to be generated by a predefinable value. The light module includes a long-pass filter arranged such that light emitted by the element can be radiated onto the long-pass filter. The long-pass filter is designed to filter the light emitted by the element and radiated onto the long-pass filter such that the filtered light has the wavelength spectrum of the light to be generated having the predefinable dominant wavelength.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
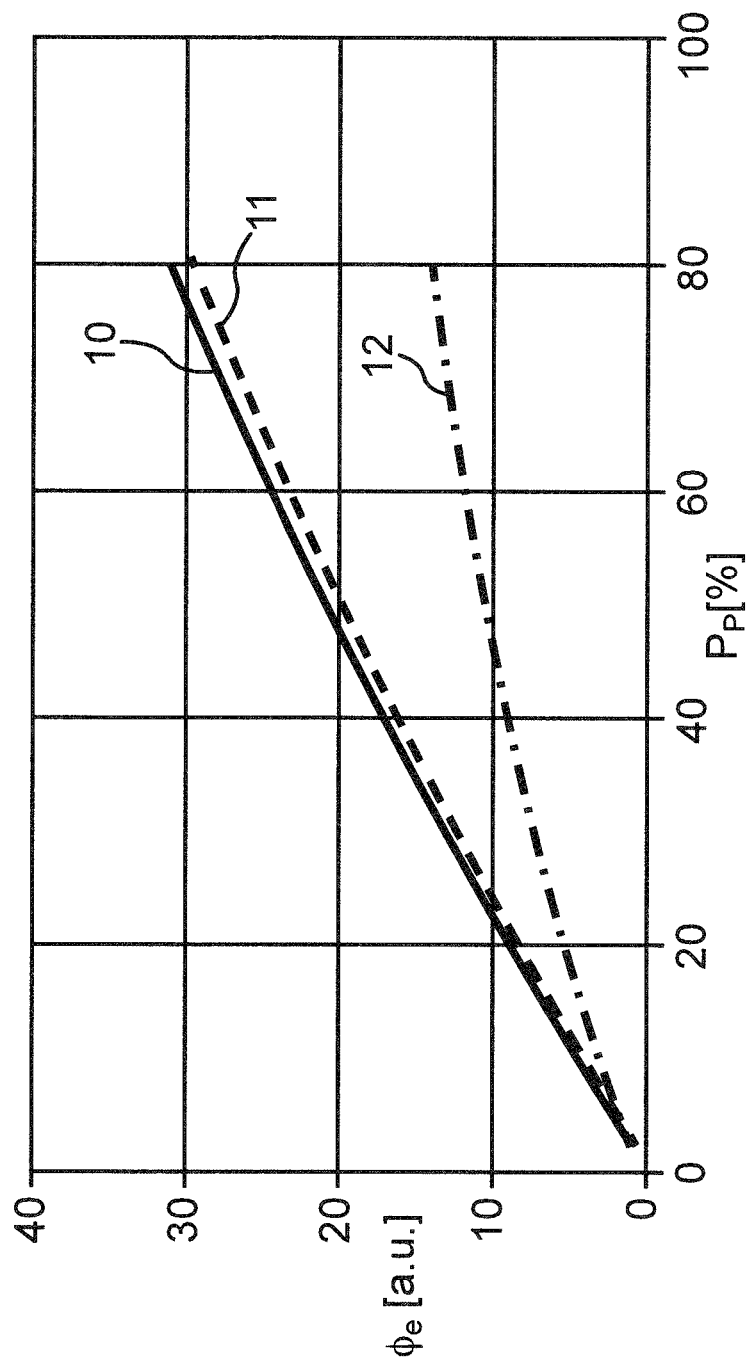
FIG. 1 shows a schematic illustration of the radiation power of a yellow phosphor, of a green phosphor and of a red phosphor as a function of the incident pump power.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a light module and a method for generating wavelength-converted light in the red spectral range and a method for providing a wavelength conversion element which make it possible to increase the efficiency at high pump powers and pump power densities.

Various embodiments are based on the insight that filtering, e.g. suitable long-pass filtering, of an emission spectrum of a yellow and/or yellow-green phosphor makes it possible to shift the dominant wavelength of said emission spectrum toward higher wavelengths, to be precise in such a way that the dominant wavelength of the long-pass-filtered yellow phosphor and/or yellow-green phosphor is greater than or equal to the dominant wavelength of an unfiltered red phosphor. As a result, in order to generate light in the red spectral range having a desired dominant wavelength, it is possible to utilize a phosphor having a lower dominant wavelength than the light to be generated, but having a higher conversion efficiency in order to generate the light having the desired dominant wavelength by filtering. Furthermore, various embodiments are based on the insight that at high excitation power densities the advantages of a higher conversion efficiency outweigh the light losses caused by the filtering and luminous flux advantages can thus be obtained.

The light module according to various embodiments for generating wavelength-converted light in the red spectral range having a predefinable first dominant wavelength of a wavelength spectrum by means of a wavelength conversion element includes a wavelength conversion element designed to absorb excitation radiation having at least one first wavelength, to convert it into light having at least one second wavelength greater than the first wavelength, and to emit said light. Furthermore, the light module includes an excitation radiation source designed to emit excitation radiation having at least the first wavelength. In this case, the excitation radiation source is arranged in such a way that excitation radiation emitted by the excitation radiation source can be radiated at least indirectly onto the wavelength conversion element. According to various embodiments, the wavelength conversion element has an emission spectrum having a red spectral component and having a second dominant wavelength, which is less than the first dominant wavelength of the wavelength spectrum of the light to be generated at least by a predefinable value. In this case, the light module furthermore includes a long-pass filter arranged in such a way that light emitted by the wavelength conversion element can be radiated at least partly and at least indirectly onto the long-pass filter. Furthermore, the long-pass filter is designed to filter the light emitted by the wavelength conversion element and radiated onto the long-pass filter in such a way that the filtered light has the wavelength spectrum of the light to be generated having the predefinable dominant wavelength.

The fact that excitation radiation emitted by the excitation radiation source can be radiated at least indirectly onto the wavelength conversion element and the fact that light emitted by the wavelength conversion element can be radiated at least partly and at least indirectly onto the long-pass filter should be understood in this case to mean that the excitation radiation source and the wavelength conversion element and respectively the wavelength conversion element and the long-pass filter can be arranged in relation to one another such that the excitation radiation can be radiated onto the wavelength conversion element and respectively the light emitted by the wavelength conversion element can be radiated onto the long-pass filter directly or else such that the excitation radiation can be radiated onto the wavelength conversion element and respectively the emitted light can be radiated onto the long-pass filter by means of one or more optical elements, such as e.g. lenses, imaging collimators, non-imaging collimators, deflection mirrors, beam splitters, e.g. dielectric mirrors, diffusers, etc.

The use of a long-pass filter makes it possible, for generating light in the red spectral range, to use a wavelength conversion element whose emission spectrum has a dominant wavelength that is less than the desired, i.e. the predefinable first dominant wavelength of the wavelength spectrum of the light to be generated. Since wavelength conversion elements, e.g. nitridic red phosphors, usually have a conversion efficiency that is all the higher, the lower their dominant wavelength, various embodiments provide the possibility of using wavelength conversion elements which exhibit very little quenching, e.g. at high excitation power densities, and a high conversion efficiency. This has the major effect that at high excitation power densities an increase in the luminous flux can thus be brought about, to be precise in spite of the radiation power losses caused by the filtering. By way of example, this makes it possible to use a yellow phosphor or a yellow-green phosphor as the wavelength conversion element and to generate light in the red spectral range by long-pass filtering, instead of using a red phosphor having a significantly lower conversion efficiency. However, not just yellow phosphors or yellow-green phosphors can be used in order to bring about an increase in efficiency when generating red light; it is also possible to use red phosphors whose dominant wavelength is shifted toward a higher, desired, wavelength by long-pass filtering. In this case, too, an increase in efficiency can be obtained in comparison with the use of red phosphors which have said desired dominant wavelength without spectral filtering. This increase in efficiency is furthermore manifested to a greater extent, the greater the excitation power density. In various embodiments, in one configuration, with increasing power density of the excitation light on the wavelength conversion element, the dominant wavelength of the conversion light is shifted into a shorter-wave range, for example from 580 nm to 550 nm, that is to say from the yellow to a yellow-green range. This can be achieved by green phosphor being added to or admixed with the yellow phosphor, such that the resulting mixed phosphor conversion element emits a dominant wavelength that is less than the dominant wavelength of the pure yellow phosphor. Since the green phosphors are distinguished by a very good thermal stability, the quenching behavior of the mixed phosphor conversion element can be optimized compared with a pure yellow phosphor, which can lead to an increased overall efficiency particularly at high pump power densities. In this case, a yellow-green phosphor can be provided for example by a mixture of Ce:YAG as yellow phosphor and Ce:LuAG as green phosphor. A further effect of a wavelength conversion element provided by an admixture of a green phosphor with a yellow phosphor is that yellow phosphors, such as Ce:YAG, and green phosphors, such as Ce:LuAG, have different absorption spectra, e.g. different absorption maxima, thus resulting in a widening of the absorption spectrum of the phosphor mixture. It is thus possible advantageously to use an excitation radiation source whose excitation radiation has a wider spectrum and does not have to be tuned exactly to one absorption maximum.

Furthermore, the use of a long-pass filter makes it possible to choose the first predefinable dominant wavelength arbitrarily at least within a predefined range. Therefore, there is no restriction to the dominant wavelengths which are assigned to the respective emission spectrum of a wavelength conversion element used. Various embodiments thus make it possible to generate wavelength-converted light in the red spectral range which has a high luminous flux at high excitation power densities, without at the same time having to make compromises with regard to the dominant wavelength, and thus with regard to the color.

In one highly efficient configuration of various embodiments, the wavelength conversion element is embodied in such a way that the second dominant wavelength of the emission spectrum of the wavelength conversion element lies in a yellow or yellow-green spectral range. In various embodiments, the dominant wavelength here is in the wavelength range of 560 nm to 580 nm. The wavelength conversion element can be embodied for example as a yellow phosphor, for example as a garnet phosphor, such as e.g. Ce:YAG, or as a yellow-green phosphor by admixing a green phosphor with the yellow phosphor. Such yellow phosphors or yellow-green phosphors have a very high conversion efficiency, e.g. in comparison with red phosphors, such as e.g. Eu-doped nitridic phosphors, such that the achievable increase in the luminous flux of the red light as a result of a filtering of the emission spectrum of the yellow phosphor or yellow-green phosphor is particularly large. A further particularly great effect is, moreover, that not only is it possible to obtain an increase in efficiency and a higher red-light luminous flux, but yellow and green phosphors are generally significantly more cost-effective than red phosphors. In this regard, therefore, a cost saving can also be obtained as a result of the use of a yellow phosphor for generating red light.

Furthermore, the wavelength conversion element can be embodied as a Ce:YAG phosphor, e.g. with a Co doping, in order to provide a predefinable emission characteristic of the wavelength conversion element. As a result of the Co doping, the emission spectrum of the phosphor and the dominant wavelength thereof can be changed in an advantageous manner. Concomitantly therewith, the quenching behavior of the phosphor also changes, such that it is possible to predefine a suitable Co doping which can provide an optimum luminous efficiency depending on the application and requirements.

In a further configuration of various embodiments, the excitation radiation source is designed to radiate excitation radiation having an excitation radiation surface power density of at least 1 kW/cm$^2$ onto the wavelength conversion element. In various embodiments, the light module or the excitation radiation source, is configured, if appropriate also in combination with optical elements of the light module, in such a way that the excitation radiation source radiates excitation radiation having an excitation radiation surface power density of at least 1 kW/cm$^2$ onto the wavelength conversion element during the operation of the light module. Since the advantages of the wavelength conversion element having the second dominant wavelength compared with a wavelength conversion element having a dominant wavelength corresponding approximately to the predefinable first dominant wavelength become clearly apparent only starting from a threshold value of the excitation radiation surface power density, the provision of an excitation radiation source which radiates with an excitation radiation surface power density of at least 1 kW/cm$^2$ onto the wavelength conversion element is particularly advantageous. The value of the excitation radiation surface power density may be in the range of from about 1 kW/cm$^2$ to about 10 kW/cm$^2$, e.g. in the range from about 2 kW/cm$^2$ to about 10 kW/cm$^2$. The greater the excitation radiation surface power density, the greater the increase in efficiency as well. However, since even the wavelength conversion element having the lower second dominant wavelength attains saturation starting from a specific excitation radiation surface power density, the excitation radiation surface power density can expediently be chosen not to have an arbitrary magnitude. However, excitation radiation surface power densities and thus also luminous fluxes of the generated light which are significantly greater than possible hitherto in the prior art are made possible by the various embodiments.

In a further advantageous configuration of various embodiments, a wavelength which is greater than 590 nm, e.g. greater than 600 nm, is predefined as the predefinable first dominant wavelength. The predefinable first dominant wavelength is furthermore e.g. predefined in a range of 590 nm-620 nm, e.g. in a range of 595 nm-610 nm. The first dominant wavelength can be selected freely in these preferred ranges. In principle, other wavelengths outside this range can also be predefined. However, for applications, such as, for example, in projectors, e.g. in cinema film projectors or else entertainment applications, in which the generated red light is intended to be combined with light of other colors, it is advantageous to choose the first dominant wavelength not to be less than 590 nm, since the lower the first dominant wavelength, the more restricted the addressable color space is as well. The first dominant wavelength should also be chosen not to be too high, i.e. not to be significantly greater than 610-620 nm, since the luminous flux that can maximally be provided decreases as the dominant wavelength increases. This is owing to the fact that the brightness sensitivity of the eye decreases greatly starting from wavelengths of 610 nm. One particularly great advantage of various embodiments is, moreover, that the predefinable wavelength is predefinable in a continuously variable manner, i.e. the limiting wavelength of a long-pass filter can be chosen such that wavelength spectra having an arbitrary first dominant wavelength can be generated. There are therefore a large number of possibilities available, depending on requirement, application, desired color gamut, maximum luminous flux, and the like, for arbitrarily predefining the first dominant wavelength.

In a further advantageous configuration of various embodiments, the light module includes a phosphor wheel, which is rotatable about a rotation axis of the phosphor wheel, wherein at least the wavelength conversion element is arranged at least in a segment of a ring-shaped region of the phosphor wheel running around the rotation axis of the phosphor wheel. In this case, e.g. at least one second wavelength conversion element is arranged at least in a second segment of the region running in a ring-shaped fashion around the rotation axis of the phosphor wheel. In this case, the second wavelength conversion element is embodied e.g. in such a way that it has a second emission spectrum having a third dominant wavelength, which is different than the first dominant wavelength. Furthermore, the third dominant wavelength is e.g. less than the first and second dominant wavelengths; by way of example, the third dominant wavelength is in the green spectral range. By means of the phosphor wheel and the use of two or more different wavelength conversion elements, light having different dominant wavelengths can thus be generated in a simple manner, which is particularly advantageous e.g. in the case of an embodiment of the light module as a projector.

In a further advantageous configuration of various embodiments, the phosphor wheel has a through opening in at least one third segment of the region running in a ring-shaped fashion around the rotation axis, wherein the light module is configured in such a way that excitation radiation emitted by the excitation radiation source, at least indirectly, during a rotation of the phosphor wheel, can be radiated sequentially onto each segment of the region of the phosphor wheel running in a ring-shaped fashion around the rotation axis. In various embodiments, the through opening of the at least one third segment is embodied such that excitation radiation emitted by the excitation radiation source can be radiated through the through opening if the at least one third segment is situated in one or more predefinable rotation angle ranges during a rotation of the phosphor wheel. As a result, part of the excitation radiation can be radiated through the phosphor wheel and, given a suitable deflection, for example by optical elements, such as deflection mirrors, can be combined with the light emitted by the wavelength conversion elements. In this case, the excitation radiation source is preferably designed to emit excitation radiation in a wavelength range of 440-470 nm, e.g. in a range of 445-455 nm. This is firstly a suitable wavelength range for exciting conventional phosphors and, secondly, this blue light is also particularly well suited to enabling a large color space of colors that can be provided by combination by means of combination with light of other wavelengths, such as e.g. red and green.

In a further advantageous configuration of various embodiments, the light module may include a phosphor wheel, which is rotatable about a rotation axis of the phosphor wheel, wherein the wavelength conversion element is arranged as the sole wavelength conversion element on the phosphor wheel. This also provides a large number of configuration possibilities. By way of example, a phosphor wheel having only one phosphor can be particularly well suited for an embodiment of the light module as a projector with three-chip technology or with a plurality of images. In this case, further phosphors can also be provided on separate carrier elements, such as further phosphor wheels or static, immobile carriers. However, a suitable embodiment and arrangement of filters also makes it possible to generate light of different colors with only one phosphor. By way of example, it is possible to generate light in the red spectral range with the use of a yellow-green phosphor in combination with the long-pass filter, and light in the green spectral range by the use of a further filter, in particular a short-pass filter. Moreover, light in the yellow spectral range can be generated by suitable filtering of the yellow-green phosphor. Furthermore, the excitation radiation in the blue spectral range can also be combined partly with the light generated by the phosphor and filtered. Furthermore, the embodiment of a carrier element as a phosphor wheel is also advantageous in the case where only one phosphor is arranged on the phosphor wheel, since in this way, as a result of the rotation of the phosphor wheel, a phosphor region is not permanently irradiated by the excitation radiation. By this means, too, it is possible to reduce the heating of the phosphor and thus to increase the conversion efficiency.

As an alternative to the use of a phosphor wheel, one configuration of various embodiments can also provide for the wavelength conversion element to be arranged on a carrier, which is arranged non-movably, that is to say e.g. in a static or stationary manner, at least relative to the excitation radiation source. This constitutes a particularly simple and cost-effective configuration of various embodiments. Nevertheless, light having different colors or spectra having different dominant wavelengths can be generated here, too, by means of suitable filtering, as described above.

Furthermore, the light module may also include one or a plurality of bandpass filters in order to address e.g. the DCI color space for digital cinema applications.

Furthermore, the excitation radiation source may include a plurality of laser diodes. The latter can be embodied for example as a laser diode array which uses laser light sources of identical type and/or of different types. Furthermore, provision can be made of additional mirrors for deflecting the light emitted by the laser diodes, by means of which the light can be directed via further optical elements for focusing and/or collimating the light onto the phosphor wheel, e.g. during rotation of the phosphor wheel, sequentially onto each of the segments of the ring-shaped region.

In a further advantageous configuration of various embodiments, the light module includes a filter wheel including at least the long-pass filter. In this case, the long-pass filter may be arranged in at least one first region of the filter wheel, wherein the filter wheel is rotatable about a rotation axis of the filter wheel in a manner corresponding to the phosphor wheel in such a way that at least part of the light emitted by the wavelength conversion element and having the second dominant wavelength can be radiated at least indirectly onto the at least one first region of the filter wheel in which the long-pass filter is arranged. Furthermore, it is advantageous to configure the filter wheel such that it has one or a plurality of further regions in which the long-pass filter is not arranged, such that light emitted by the at least one second wavelength conversion element and/or part of the excitation radiation can be radiated onto the one or the plurality of regions of the filter wheel in which the long-pass filter is not arranged, during a corresponding rotation of phosphor wheel and filter wheel, e.g. at the same angular velocity. In this case, the long-pass filter can be embodied in a circle-segment-shaped fashion, for example, and be arranged in a circle segment of the filter wheel. The long-pass filter can also be arranged only in a partial region of a circle segment of the filter wheel, for example analogously to the embodiment of the phosphor wheel in a segment of a region of the filter wheel that runs around the rotation axis of the filter wheel in a ring-shaped fashion. The long-pass filter can also be arranged in a plurality of regions of the filter wheel or a plurality of long-pass filters, embodied in particular such that they are of identical type, can be arranged in different regions or segments of the filter wheel, e.g. if the wavelength conversion element having the second dominant wavelength is likewise arranged in a plurality of segments of the ring-shaped region of the phosphor wheel. Furthermore, the filter wheel may also include one or a plurality of filters different than the long-pass filter, e.g. for filtering light emitted by the second wavelength conversion element, which may be embodied as a green phosphor. By way of example, the further filter can be embodied as a short-pass filter and filter out yellow spectral components of light emitted by the green phosphor arranged on the phosphor wheel. In the case of the filtering of green phosphor light, although no advantages with regard to a higher luminous flux can be achieved, a better green hue can be generated as a result, by means of which the color gamut that can be provided can likewise be enlarged and improvements with regard to the white point can be achieved. The long-pass filter and/or the further filters can furthermore be applied to one side of the filter wheel as a coating at least in regions. On the other side of the filter wheel, an antireflection coating can furthermore be applied in order to enable a maximum transmission of filtered light and also unfiltered light.

In a further particularly advantageous configuration of various embodiments, the filter wheel has at least one second region in which the long-pass filter is not arranged, wherein the filter wheel is rotatable in a manner corresponding to the phosphor wheel in such a way that part of the light emitted by the wavelength conversion element and having the second dominant wavelength can be radiated at least indirectly onto the at least one second region of the filter wheel in which the long-pass filter is not arranged. This is advantageous e.g. if the wavelength conversion element is embodied as a yellow phosphor. In this regard, part of the light emitted by the yellow phosphor can be radiated onto the long-pass filter in order to generate light in the red spectral range, and part of the light emitted by the yellow phosphor can be radiated onto the second region of the filter wheel, which has no filter and in which the yellow light is transmitted without filtering through the filter wheel. In this regard, light in the yellow spectral range and light in the red spectral range can be generated advantageously by the use of only one phosphor, mainly the yellow phosphor.

The method according to various embodiments for generating wavelength-converted light in the red spectral range having a predefinable first dominant wavelength of a wavelength spectrum by means of a wavelength conversion element includes:

a) providing a wavelength conversion element, which, upon absorbing excitation radiation having at least one first wavelength, converts this into light having at least one second wavelength and emits said light, wherein the second wavelength is greater than the first wavelength;

b) radiating excitation radiation including radiation having the first wavelength up to the wavelength conversion element;

wherein in a) a wavelength conversion element is provided which has an emission spectrum having a second dominant wavelength, which is less than the first dominant wavelength of the wavelength spectrum of the light to be generated at least by a predefinable value, and has a red spectral component. In this case, furthermore after b) in a further process c) the light emitted by the wavelength conversion element is filtered at least partly by a long-pass filter in such a way that the filtered light has the wavelength spectrum of the light to be generated having the predefinable dominant wavelength.

The substantive features mentioned for the light module according to various embodiments and its configurations in this case enable the development of the method according to various embodiments by further processes. Furthermore, the features and feature combinations and their advantages mentioned for the light module according to various embodiments and its configurations apply in the same way to the method according to various embodiments.

The method according to various embodiments for providing a wavelength conversion element includes:

a) predefining an excitation radiation surface power density for exciting the wavelength conversion element;

b) providing an assignment of luminous fluxes depending on excitation radiation surface power densities for a plurality of long-pass-filtered wavelength spectra having in each case an identical, in particular the first, dominant wavelength from a plurality of phosphors having in each case different doping proportions, said phosphors being formed from a wavelength-converting basic material and being doped with doping atoms;

c) on the basis of the assignment provided in b), determining a phosphor from the plurality of phosphors which has the highest luminous flux value for the excitation radiation surface power density predefined in a); and d) providing the wavelength conversion element as the phosphor determined in c).

This aspect of various embodiments make it possible to optimize the increase in efficiency even further. This makes use of the insight that the quenching behavior and also the size of the red spectral component can be influenced by different doping proportions. By way of example, in the case of Ce-doped YAG phosphors and in the case of Eu-doped nitridic phosphors, the dominant wavelength of the emission spectrum is shifted toward longer wavelengths with increasing Ce and Eu doping, respectively, as a result of which the red spectral component of the emission spectrum also increases. At the same time, a higher doping proportion also intensifies the quenching, i.e. with increasing excitation radiation surface power density the conversion efficiency deteriorates to a significantly greater extent in the case of phosphors having a high doping proportion than in the case of phosphors having a lower doping proportion. By virtue of the assignment provided in accordance with this aspect of the invention, for a desired dominant wavelength to be generated and a given excitation radiation surface power density, it is possible to determine the phosphor which yields the greatest possible luminous flux for this application. This method is particularly advantageous in combination with a light module according to various embodiments and/or the configuration variants thereof, e.g. for providing a wavelength conversion element for such a light module, and also in combination with the method according to various embodiments for generating wavelength-converted light or for providing the wavelength conversion element for the method according to various embodiments for generating wavelength-converted light.

The substantive features mentioned for the light module according to various embodiments and its configurations and features mentioned for the method according to the invention for generating wavelength-converted light in this case enable the development of the method according to various embodiments for providing a wavelength conversion element by further processes. Furthermore, the features and feature combinations and their advantages mentioned for the light module and method according to various embodiments for generating wavelength-converted light and the configurations thereof hold true in the same way, insofar as applicable, for the method according to various embodiments for providing a wavelength conversion element.

Figure 2:
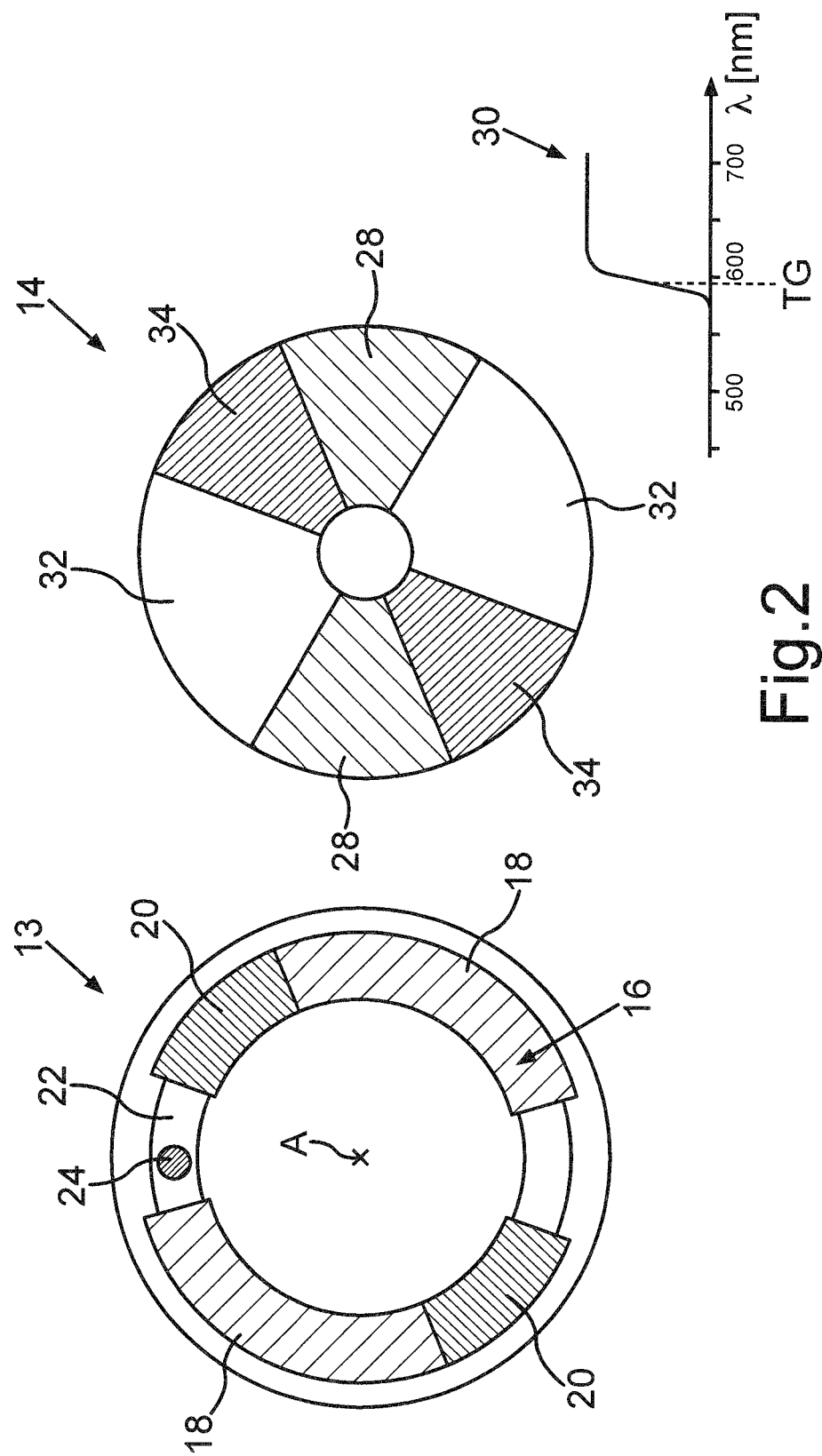
FIG. 2 shows a schematic illustration of a phosphor wheel and a corresponding filter wheel in accordance with one embodiment.

FIG. 2 is a schematic illustration of a phosphor wheel 13 and of a corresponding filter wheel 14 for a light module 15 (cf. FIG. 3) in accordance with one embodiment. In this case, the phosphor wheel 13 is embodied as rotatable about the rotation axis A and has a segmented region 16 running around the rotation axis A in a ring-shaped fashion. In this case, a yellow phosphor 18 is arranged in two segments of said region 16 and a green phosphor 20 is arranged in two further segments of said region 16. Two more segments of the ring-shaped region 16 have no phosphor, but rather are embodied with a through opening 22. In this case, the circle illustrated in the upper through opening 22 is intended to schematically illustrate the excitation radiation 24 from the excitation radiation source 26 (cf. FIG. 3), said excitation radiation being focused onto the phosphor wheel 13. As a result of the rotation of the phosphor wheel, each segment of the ring-shaped region can thus be irradiated sequentially with the excitation radiation 24. As a result of the excitation of the yellow phosphor 18 by means of the excitation radiation 24, the yellow phosphor 18 emits light having an emission spectrum which has, for example, a dominant wavelength $\lambda_D$ in the yellow spectral range. Likewise, upon excitation by the excitation radiation 24, the green phosphor 20 emits light having an emission spectrum which has a dominant wavelength $\lambda_D$ in the green spectral range. The light emitted by the phosphors 18 and 20 and also the excitation radiation 24 transmitted through the through opening 22 of the phosphor wheel 13 can be focused onto the filter wheel 14 e.g. by suitable optical elements. As an alternative to the yellow phosphor 18, a yellow-green phosphor can also be used here in the same way.

The filter wheel 14 has a plurality of circle-segment-shaped regions. In this case, a long-pass filter is arranged in two of said regions and filters light impinging thereon in accordance with the filter characteristic curve 30 illustrated. Said long-pass filter 28 transmits light having a wavelength above its limiting wavelength TG and is substantially non-transmissive to light having wavelengths less than the limiting wavelength TG. Said long-pass filter 28 is designed, then, to filter the light emitted by the yellow phosphor 18 in such a way that the dominant wavelength $\lambda_D$ of the resultant wavelength spectrum of the filtered light is greater than the dominant wavelength $\lambda_D$ of the emission spectrum of the yellow phosphor 18, e.g. by a predefinable value determined by the limiting wavelength TG of the long-pass filter 28. Consequently, by means of filtering it is possible to generate light in the red spectral range which, for the same excitation radiation surface power density, has a significantly higher luminous flux than the light emitted by a red phosphor and having a comparable or the same dominant wavelength, since the significantly higher conversion efficiency of the yellow phosphor 18 more than just compensates for the light losses arising as a result of the filtering. In this case, this luminous flux advantage is all the greater, the greater the excitation radiation surface power density of the excitation radiation 24. Therefore, it is advantageous to irradiate the yellow phosphor 18 for excitation with an excitation radiation surface power density of approximately at least 1 kW/cm$^2$. The same also applies to a yellow-green phosphor.

In two further circular segments 32 of the filter wheel 14, the filter wheel 14 is embodied as light-transmissive, that is to say in particular without a wavelength filter. Consequently, by means of corresponding movement of the filter wheel 14 and of the phosphor wheel 13 in conjunction with furthermore an appropriately corresponding embodiment of the segments of the phosphor wheel 13 and of the filter wheel 14, part of the light emitted by the yellow phosphor 18 can be radiated onto the regions with the long-pass filters 28 of the filter wheel 14 and part of the emission light can be radiated onto the light-transmissive regions 32 of the filter wheel 14. Light in the yellow spectral range and at the same time also in the red spectral range can thus be generated by means of only one phosphor, namely the yellow phosphor 18. Furthermore, the light-transmissive region 32 of the filter wheel 14 is also embodied in a manner corresponding to the phosphor wheel 13 in such a way that the excitation radiation 24 which passes through the phosphor wheel 13 through the through openings 22 can also be radiated onto the light-transmissive regions 32 of the filter wheel 14 and can pass through the latter without a change in the spectral distribution.

Furthermore, a further filter is arranged in two further circle-segment-shaped regions of the filter wheel 14, said further filter being embodied here as a short-pass filter 34 and being designed to filter out the yellow spectral component of the light radiated onto said short-pass filter 34 from the green phosphor 20, such that the dominant wavelength of the emission spectrum of the green phosphor 20 is shifted toward shorter wavelengths. As a result, the color space that is addressable by combination of the phosphor light and the excitation radiation 24 can be enlarged. These short-pass filters 34 illustrated here are merely optional. Alternatively, these regions in which the short-pass filters 34 are arranged can also be embodied as light-transmissive, e.g. in the same way as the light-transmissive regions 32.

The filters, i.e. the long-pass filters 28 and the short-pass filters 34, may furthermore be applied on one side of the filter wheel 14 as a coating. Furthermore, an antireflection layer can be applied on the other side of the filter wheel 14, e.g. across all regions through which light can be radiated, in order to minimize light losses as a result of reflection.

Furthermore, further other phosphors, e.g. cyan and/or magenta phosphors, may also be arranged on the phosphor wheel 13. Equally, instead of the yellow and green phosphors described, other phosphors can also be arranged on the phosphor wheel 13 and/or the phosphor regions can also be embodied differently in terms of their arrangement, embodiment and size. In order to provide a color space by combination of primary colors, red, green and blue are advantageous above all as primary colors. Consequently, it is also possible for the segment of the phosphor wheel 13 having the yellow phosphor 18 to be embodied in terms of its size and arrangement such that light emitted by the yellow phosphor 18 is radiated almost completely, e.g. apart from unavoidable light losses, onto the long-pass filter or filters 28. However, light in the yellow spectral range that is available for combination in addition has the advantage that the addressable color space can be enlarged by this means as well. Provision can also be made for arranging a red phosphor on the phosphor wheel 13, as an alternative or in addition to the yellow phosphor 18. The light emitted by the red phosphor can be radiated onto the long-pass filter 28 of the filter wheel 14 in order to generate light in the red spectral range having a greater dominant wavelength than that of the emission spectrum of the red phosphor itself. In this regard, by way of example, a red hue that brings about an improved subjective color perception can be generated and the addressable color space can in turn be enlarged as a result. Furthermore, this also entails luminous flux advantages in comparison with the use of red phosphors whose emission spectra have as dominant wavelength from the outset a higher dominant wavelength.

The segment sizes of the phosphor wheel 13 can also be dimensioned differently and configured depending on the desired luminous flux in individual color channels or the desired luminous flux ratios of the luminous fluxes with respect to one another depending on the application.

Figure 3:
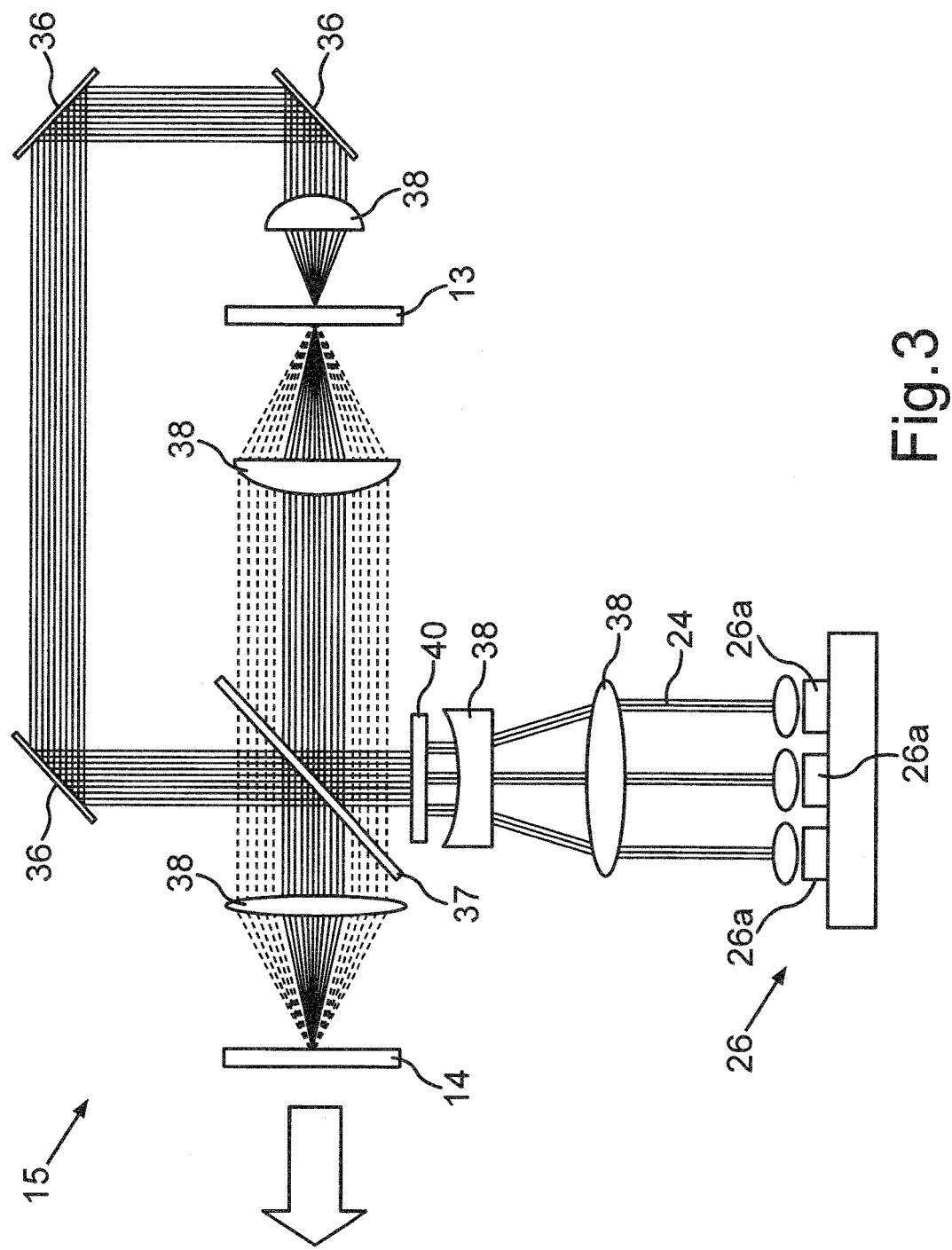
FIG. 3 shows schematic illustration of a light module including a phosphor wheel and a filter wheel in accordance with one embodiment.

FIG. 3 shows a schematic illustration of a light module 15 in accordance with one embodiment. In this case, the light module 15 includes an excitation radiation source 26 embodied as a laser diode array and including a plurality of laser diodes 26a. Other radiation sources would also be conceivable, such as, for example, those including LASERs, superluminescence diodes, LEDs, organic LEDs and the like. The excitation radiation source 26 is designed to emit excitation radiation 24 in the blue or ultraviolet spectral range, preferably in the range of 440-470 nm, e.g. at approximately 450 nm, since this constitutes a suitable excitation wavelength for most phosphors. Via optical elements 38, 40, the light from said laser diodes 26a is directed onto a wavelength conversion element, which can be arranged for example on a phosphor wheel 13. In this case, the phosphor wheel 13 can be embodied, e.g. as described with regard to FIG. 2. At least one first phosphor, preferably a yellow phosphor 18 (cf. FIG. 2) or yellow-green phosphor, whose emission spectrum has at least one red spectral component is arranged on the phosphor wheel 13. In this case, even further different phosphors can be arranged on the phosphor wheel 13, which phosphors are arranged in particular in segments of the phosphor wheel 13 and can be sequentially irradiated and excited for the emission of wavelength-converted light by means of the rotation of the phosphor wheel 13. Furthermore, the phosphor wheel 13 has at least one through opening 22, such that the excitation radiation 24 radiated onto the phosphor wheel 13 can be transmitted partly through the phosphor wheel 13. By means of suitable deflection of this transmitted excitation radiation 24, it can be combined with the emitted light converted by the phosphor wheel 13, for which purpose, in particular, an integrator (not illustrated) can also be provided, onto which the combined beam of rays is directed. In order to deflect the excitation radiation 24 transmitted through the phosphor wheel 13, e.g. three mirrors 36 are provided, which are arranged in the beam path in each case at an angle of 45° with respect to the incident excitation radiation 24. Furthermore, a dichroic mirror 37 is arranged in the beam path between the excitation radiation source 26 and the phosphor wheel 13 and is designed to reflect light in the blue spectral range and to transmit light in the non-blue spectral range, i.e. light having longer wavelengths. Furthermore, even further optical elements, e.g. in the form of lenses 38, are arranged in the beam path and have substantially a focusing and collimating effect.

Furthermore, a diffuser 40 is arranged upstream of the dichroic mirror 37 in the beam path in order to generate an expanded intensity profile on the phosphors by diffusing the excitation radiation 24.

The converted light emitted by the phosphor wheel 13 is emitted in the direction of the dichroic mirror 37 and is directed onto a filter wheel 14 by means of optical elements 37, 38. In this case, the filter wheel 14 can be embodied as described with regard to FIG. 2. In this case, the phosphor wheel 13 and the filter wheel 14 correspond in terms of their embodiment, arrangement and movement in such a way that the light emitted by the first phosphor is radiated at least partly onto one or a plurality of long-pass filters 28 arranged on the filter wheel 14. The light emitted by other phosphors arranged on the phosphor wheel 13 and the deflected excitation radiation 24 are likewise radiated onto the filter wheel 14, but onto regions of the filter wheel 14 in which no long-pass filter 28 is arranged, and can pass through the filter wheel 14 without filtering or can likewise pass through a filter.

Figure 4:
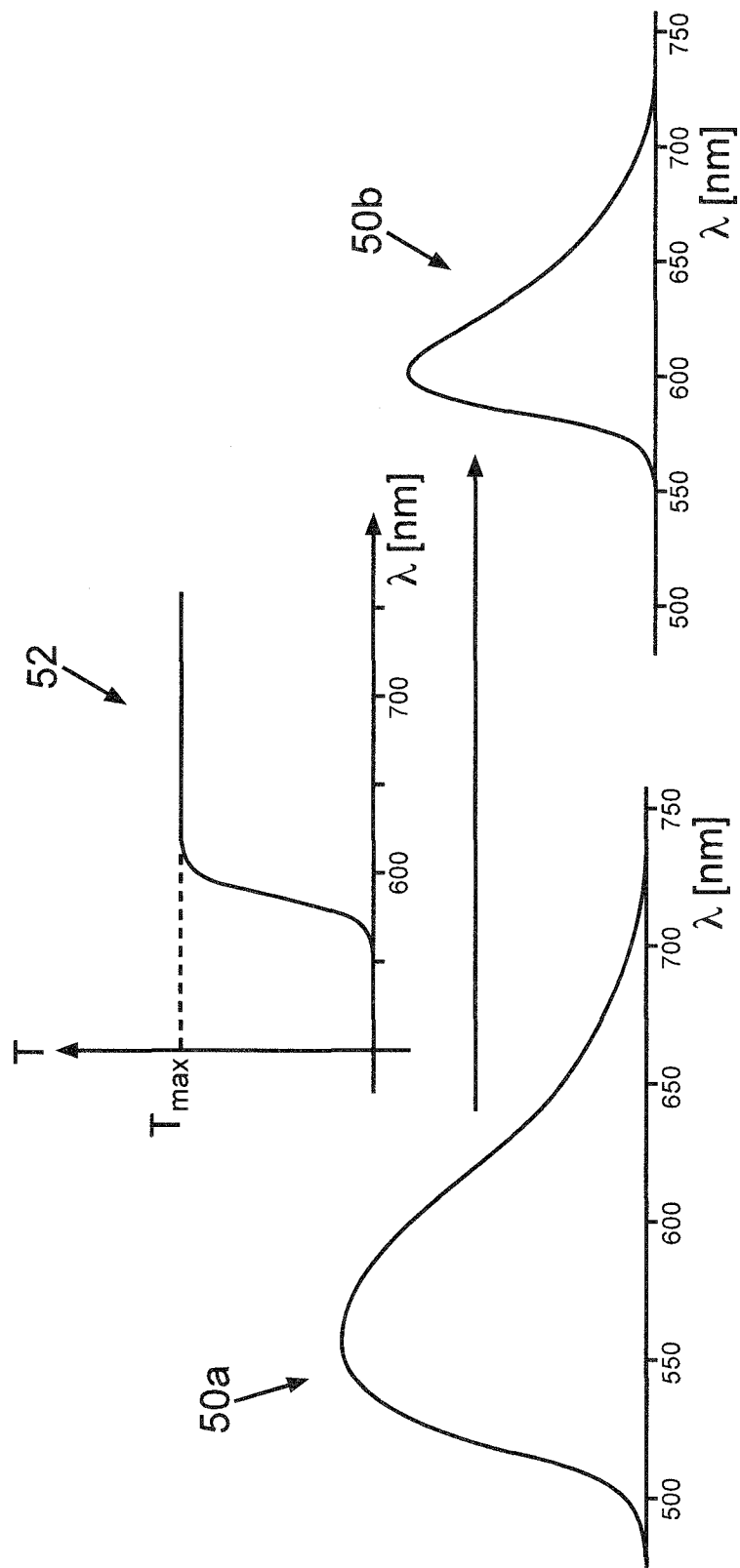
FIG. 4 shows a schematic illustration of a wavelength spectrum of a yellow phosphor before and after filtering by a long-pass filter in accordance with one embodiment.

FIG. 4 shows a schematic illustration of an emission spectrum 50a of a yellow phosphor 18 before filtering and the wavelength spectrum 50b after the filtering by a long-pass filter 28 (cf. FIG. 2) with the illustrated filter characteristic curve 52 for clarifying the functional principle of the light module 15 (cf. FIG. 3) or the procedure in the method for generating light in the red spectral range in accordance with one embodiment of the invention. The spectral distribution of the emission light 50a of the unfiltered yellow phosphor 18 has a dominant wavelength $\lambda_D$ of approximately 571 nm for the yellow phosphor 18 used here by way of example and the efficiency $\eta$ of this converted emission light, i.e. the luminous flux $\Phi_v$ in relation to the radiation power $\Phi_e$, is 473 lm/W in the case where excitation radiation 24 is incident on the yellow phosphor 18 with a predefined excitation power density, i.e. excitation power per unit area. In this case, the wavelength spectrum 50b of the yellow phosphor 18 also includes a red spectral component. Consequently, by means of suitable filtering, it is possible to generate light in the red spectral range, i.e., e.g. by means of filtering, the dominant wavelength $\lambda_D$ can be "shifted" into the red spectral range. By way of example, a long-pass filter 28, the filter characteristic curve 52 of which is likewise illustrated schematically, is suitable for this purpose. Said filter characteristic curve 52 illustrates the transmittance T as a function of the wavelength λ. In this case, $T_{max}$ denotes the maximum transmittance. If the light emitted by the yellow phosphor 18 is then filtered by such a long-pass filter 28, the filtered wavelength spectrum 50b illustrated on the right results. The latter then has a dominant wavelength $\lambda_D$ at approximately 601 nm and an efficiency η of 289 lm/W. Despite the decrease in efficiency resulting from the filtering, nevertheless an increase in the efficiency η in comparison with the use of a red phosphor can advantageously be obtained.

Figure 5:
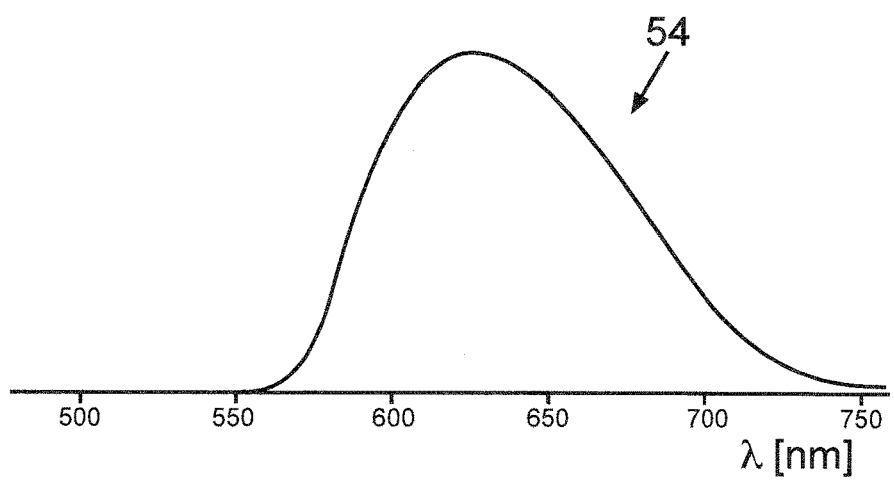
FIG. 5 shows a schematic illustration of the wavelength spectrum of a red phosphor.

In order to make clear the advantages of this filtering when generating light in the red spectral range, FIG. 5 illustrates for comparison an emission spectrum 54 of a red phosphor having a dominant wavelength λ at approximately 599 nm. In the case of excitation of this red phosphor with excitation radiation 24 having the same excitation power density as in the case of the yellow phosphor 18 in accordance with FIG. 4, an efficiency η of 224 lm/W results, which is thus significantly lower than in the case of the filtered wavelength spectrum 50b of the yellow phosphor 18.

Said yellow phosphor 18 can be used particularly advantageously, then, to generate light in the red spectral range and in this case at the same time to increase the efficiency of the light thus generated in comparison with light converted by a red phosphor.

Figure 6:
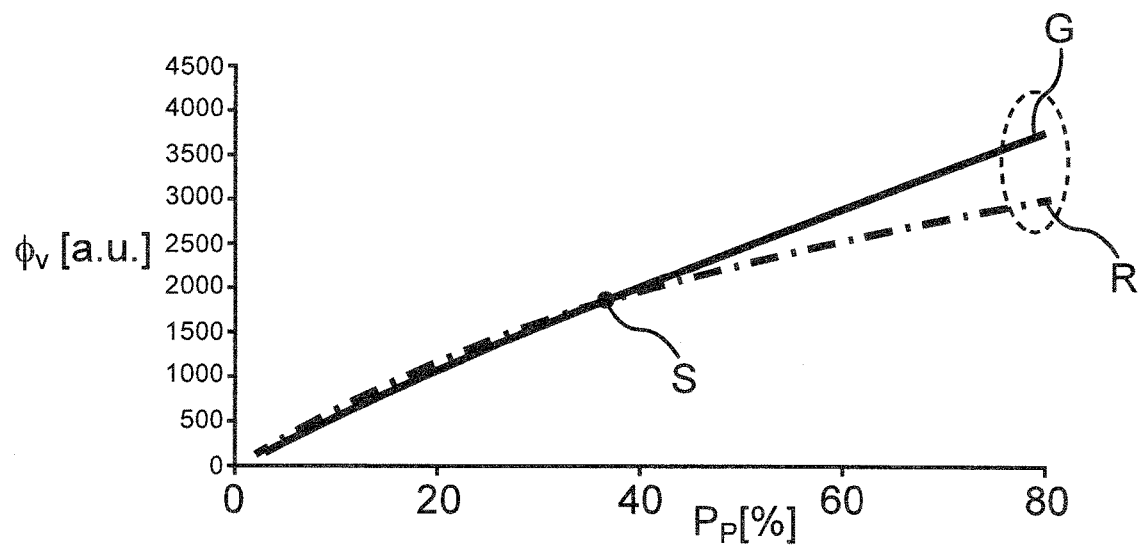
FIG. 6 shows a schematic illustration of the dependence of the luminous flux on the incident pump power for a red phosphor and a filtered yellow phosphor.

FIG. 6 shows a schematic illustration of the dependence of the luminous flux $\Phi_v$ on the incident pump power $P_P$ for a red phosphor, illustrated as the curve designated by R, and a filtered yellow phosphor 18, illustrated as the curve designated by G. In this case, the excited phosphor area of the yellow phosphor 18 and that of the red phosphor are the same. In this case, it can clearly be discerned that, starting from a specific threshold value S of the pump power $P_P$, as the pump power $P_P$ increases, the increase in the luminous flux of the light generated by the filtered yellow phosphor 18 is greater than that of the light emitted by the red phosphor. Said threshold value S is approximately 1 kW/cm². This means that at excitation power densities starting from approximately 1 kW/cm² the use of a yellow phosphor 18 in combination with a long-pass filter 28 for generating light in the red spectral range is significantly more effective than the use of a red phosphor. This is owing to the fact that at high excitation power densities the reduced quenching effects of a yellow phosphor 18 compared with a red phosphor are distinctly manifested and a distinct increase in the luminous flux $\Phi_v$ can thus be obtained despite filtering.

Figures 7A, 7B:
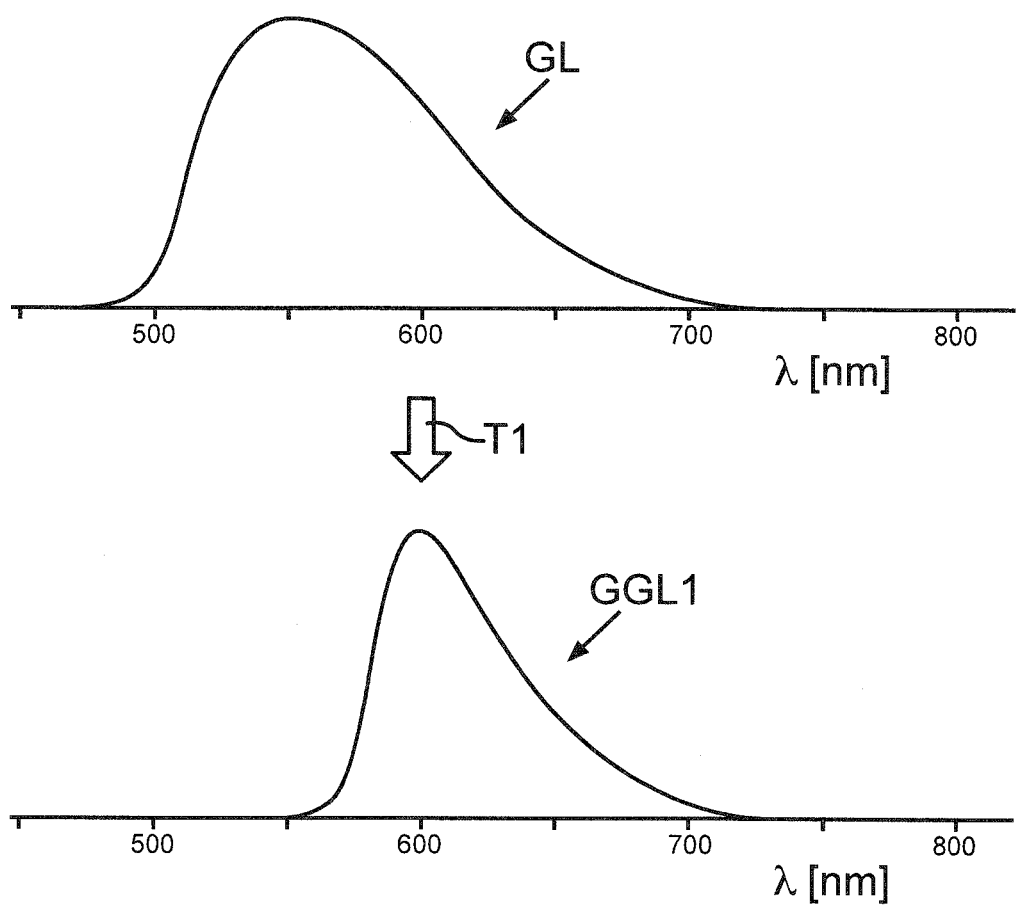
FIG. 7a shows a schematic illustration of the wavelength spectra of a yellow phosphor before and after the filtering by a long-pass filter for generating light in the red spectral range having a dominant wavelength of 600 nm in accordance with one embodiment.
FIG. 7b shows a tabular illustration—corresponding to FIG. 7a—of comparative values for a red phosphor, a yellow phosphor and the filtered yellow phosphor for providing light in the red spectral range having a dominant wavelength of 600 nm.
Figures 8A, 8B:
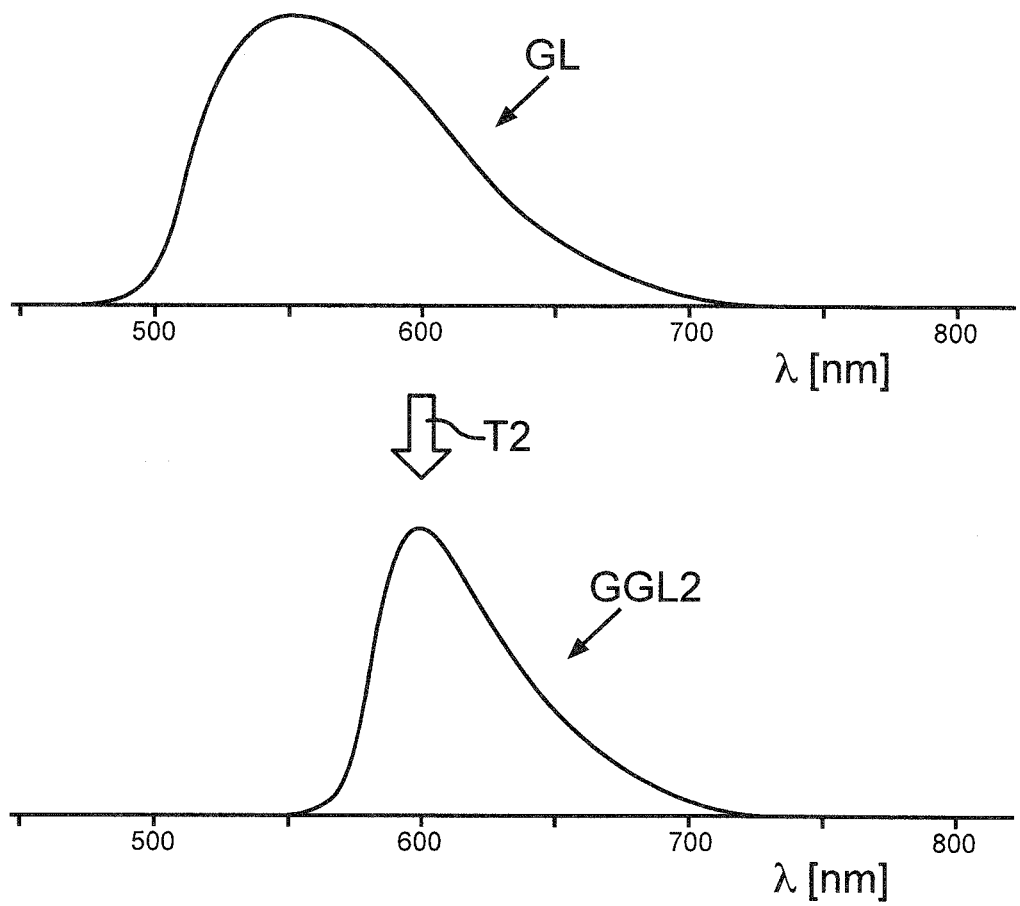
FIG. 8a shows a schematic illustration of the wavelength spectra of a yellow phosphor before and after the filtering by a long-pass filter for generating light in the red spectral range having a dominant wavelength of 603 nm in accordance with one embodiment.
FIG. 8b shows a tabular illustration—corresponding to FIG. 8a—of comparative values for a red phosphor, a yellow phosphor and the filtered yellow phosphor for providing light in the red spectral range having a dominant wavelength of 603 nm.
Figures 9A, 9B:
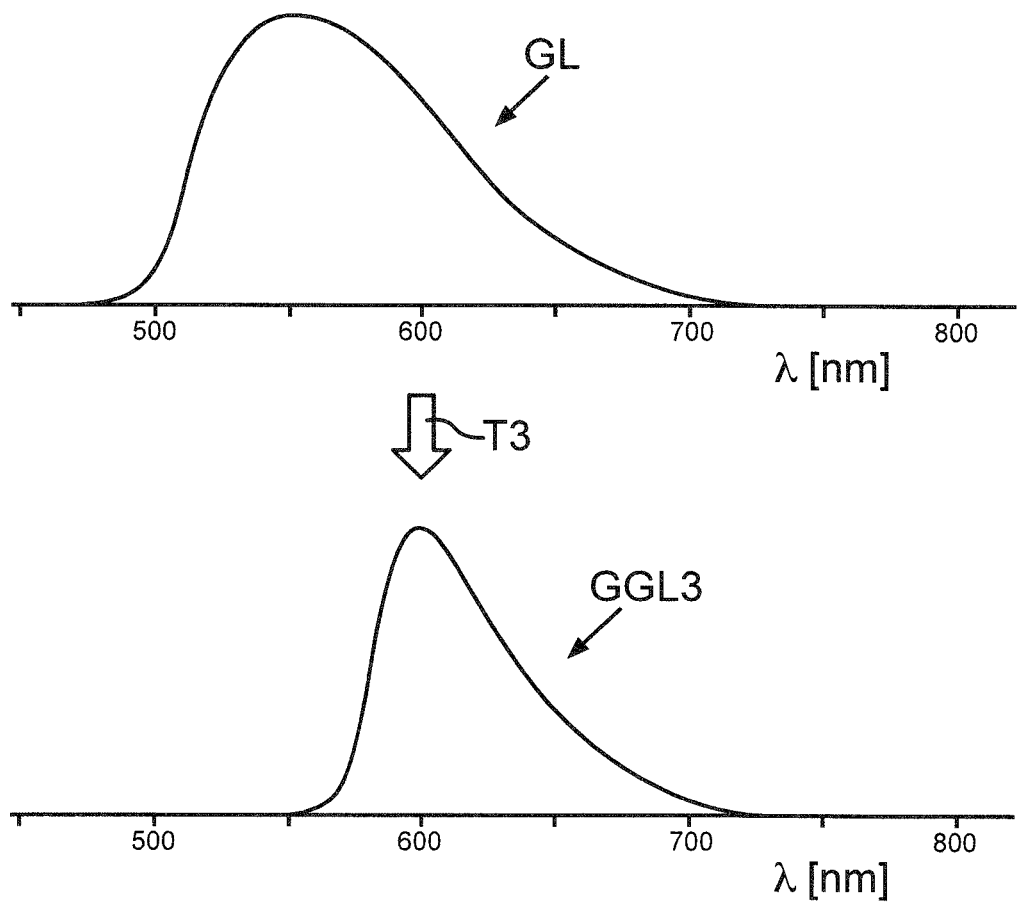
FIG. 9a shows a schematic illustration of the wavelength spectra of a yellow phosphor before and after the filtering by a long-pass filter for generating light in the red spectral range having a dominant wavelength of 608 nm in accordance with one embodiment.
FIG. 9b shows a tabular illustration—corresponding to FIG. 9a—of comparative values for a red phosphor, a yellow phosphor and the filtered red phosphor and the filtered yellow phosphor for providing light in the red spectral range having a dominant wavelength of 608 nm.

FIG. 7a, FIG. 8a and FIG. 9a illustrate the filtered wavelength spectra GGL1, GGL2, GGL3 which arise in the case of a method and a light module 15 in accordance with various embodiments in which a yellow phosphor 18 is used for generating light in the red spectral range, the emission spectrum GL of which is likewise illustrated schematically and was filtered by means of long-pass filters 28 having different limiting wavelengths T1, T2 and T3. The dominant wavelengths $\lambda_D$ of these spectra and the radiation power $\Phi_e$ and the luminous flux $\Phi_v$ brought about by the light having these spectral distributions are indicated in tabular form in FIG. 7b, FIG. 8b and FIG. 9b. In addition, the comparative values of a red phosphor are also indicated in the tables.

FIG. 7a shows a schematic illustration of the emission spectrum GL of a yellow phosphor 18 and the wavelength spectrum GGL1 which arises as a result of a filtering of the emission spectrum GL by means of a long-pass filter 28. In various embodiments, light in the red spectral range having a dominant wavelength $\lambda_D$ of 600 nm is intended to be generated as a result of this filtering. In this case, the long-pass filter 28 has a limiting wavelength T1=585 nm, i.e. 50% of light having this wavelength which impinges on the long-pass filter 28 is transmitted. In this example, the edge steepness $\lambda_{10\%-90\%}$ of the long-pass filter 28 is 25 nm, i.e. the width of the wavelength range in which the transmittance T of the long-pass filter 28 rises from 10% to 90% is 25 nm. The emission spectrum GL of the yellow phosphor 18 illustrated here has a dominant wavelength $\lambda_D$ of 568.4 nm. The filtered wavelength spectrum GGL1 has a dominant wavelength $\lambda_D$ of 600.2 nm. Furthermore, in this example, the yellow phosphor 18 was excited with an excitation radiation 24 having an excitation radiation surface power density of approximately 2 kW/cm².

The advantages which can be achieved by means of such a filtering with regard to efficiency η and luminous flux $\Phi_v$ can be gathered from the table illustrated in FIG. 7b. Said table shows the values of the dominant wavelengths $\lambda_D$, of the radiation powers $\Phi_e$, of the efficiency η and of the luminous fluxes $\Phi_v$ of the light of the emission spectrum GL illustrated in FIG. 7a and of the filtered wavelength spectrum GGL of the yellow phosphor 18 in comparison with the values of an emission spectrum RL of a red phosphor having a dominant wavelength $\lambda_D$ of 600.8 nm, which was excited with the same excitation radiation surface power density. As can be gathered from the table, a significant increase in efficiency and an increase in the luminous flux $\Phi_v$ by 48% can be obtained by means of the filtering of the light of the yellow phosphor 18.

FIG. 8a shows a schematic illustration of the emission spectrum GL of a yellow phosphor 18, e.g. the same as already illustrated in FIG. 7a, and the wavelength spectrum GGL2 which arises as a result of filtering of the emission spectrum GL by means of a long-pass filter 28. The latter in this case has a limiting wavelength T2=590 nm and an edge steepness $\lambda_{10\%-90\%}$=25 nm in order to generate light in the red spectral range having a dominant wavelength $\lambda_D$ of 603 nm. The values corresponding to these spectra GL and GGL2 are once again illustrated in tabular form in FIG. 8b, e.g. again in comparison with the values of the emission spectrum RL of the red phosphor having the dominant wavelength $\lambda_D$ at 600.8 nm. As can be gathered in particular from the values for efficiency η and luminous flux $\Phi_v$, as a result of the filtering of the emission spectrum GL of the yellow phosphor 18, in comparison with the red phosphor, an increase in the efficiency η and the luminous flux $\Phi_v$ can be brought about and at the same time a dominant wavelength $\lambda_D$ that is longer by approximately 2.5 nm can also be implemented in an advantageous manner.

FIG. 9a shows a further schematic illustration of the emission spectrum GL of the yellow phosphor 18, e.g. once again the same as already illustrated in FIG. 7a and FIG. 8a, and the wavelength spectrum GGL3 which arises as a result of the filtering of the emission spectrum GL by means of yet another long-pass filter 28. The latter in this case has a limiting wavelength T3=595 nm and an edge steepness $\lambda_{10\%-90\%}$=20 nm in order to generate light in the red spectral range having a dominant wavelength $\lambda_D$ of 608 nm. The values corresponding to said spectra GL and GGL3 are once again illustrated in tabular form in FIG. 9b, e.g. again in comparison with the values of the emission spectrum RL of the red phosphor having the dominant wavelength $\lambda_D$ at 600.8 nm and additionally also in comparison with the values of a wavelength spectrum GRL which arises from the emission spectrum RL of the red phosphor as a result of filtering by means of a long-pass filter 28. In this case, the red phosphor once again has an emission spectrum RL having a dominant wavelength $\lambda_D$ of 600.8 nm, and the filtered wavelength spectrum GLR of the red phosphor has a dominant wavelength $\lambda_D$ of 608.0 nm. In this case, it can be gathered from the values illustrated in the table that it is significantly more efficient and also associated with a higher luminous flux $\Phi_v$ to generate light by filtering a yellow phosphor 18 than to generate light by filtering the red phosphor. The advantages of the filtering of emission spectra GL of yellow phosphors compared with the filtering of emission spectra RL of red phosphors will be clarified in FIG. 10.

Figure 10:
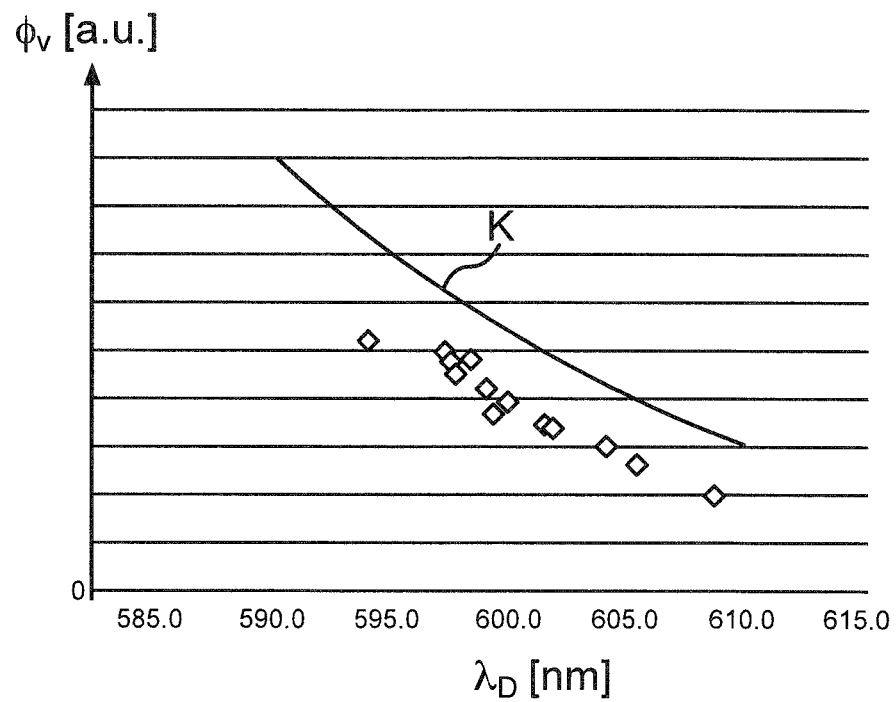
FIG. 10 shows a schematic illustration of the luminous flux for different unfiltered red phosphors having in each case different dominant wavelengths in comparison with light having different dominant wavelengths that is generated by means of a filtered yellow phosphor.

FIG. 10 shows a schematic illustration of the luminous flux $\Phi_v$ for various unfiltered red phosphors having in each case a different dominant wavelength $\lambda_D$ in comparison with light generated by means of a filtered yellow phosphor 18. In the diagram illustrated, in this case the dominant wavelength $\lambda_D$ is plotted on the abscissa and the luminous flux $\Phi_v$ is plotted on the ordinate. The points represented as rhombi represent the luminous flux values of different red phosphors, e.g. from different manufacturers and composed of different materials having different dopings, with the respective dominant wavelengths $\lambda$. The curve K depicted in a continuous fashion represents the profile of the luminous flux $\Phi_v$ of light generated by the filtering of an emission spectrum 50a of a yellow phosphor 18 as a function of the dominant wavelength $\lambda_D$ of the light thus generated. For this purpose, the emission spectrum 50a of a yellow phosphor 18 was filtered by different long-pass filters 28 and the values of the luminous flux $\Phi_v$ for the different dominant wavelengths $\lambda_D$ resulting from the respective different filterings were interpolated. As can be seen, therefore, by using a yellow phosphor 18 in combination with a long-pass filtering of the emitted light, it is possible to obtain a significant increase in the luminous flux $\Phi_v$, e.g. by 25%-40%, in comparison with the use of red phosphors.

However, it is possible not just to use yellow phosphors 18 in order to bring about an increase in efficiency when generating red light; it is also possible to use red phosphors whose dominant wavelength $\lambda_D$ is shifted toward a higher, desired, wavelength by long-pass filtering. This will be made clear by FIG. 11.

Figure 11:
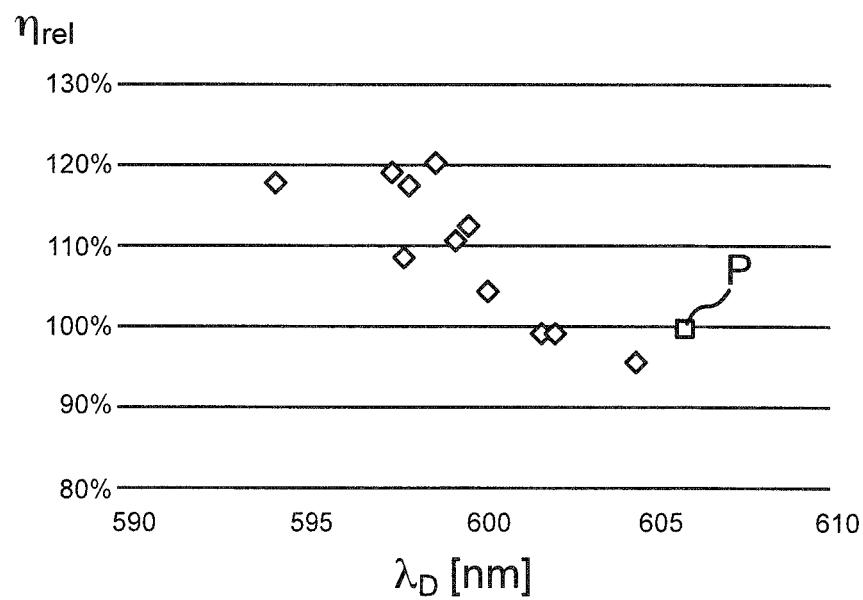
FIG. 11 shows a schematic illustration of efficiency values for different red phosphors having in each case different dominant wavelengths, by means of which light in the red spectral range having a dominant wavelength of 605 nm was generated by filtering, in comparison with the efficiency of light having a dominant wavelength of 605 nm that was generated by means of an unfiltered red phosphor.

FIG. 11 shows a schematic illustration of efficiency values for various red phosphors having in each case a different dominant wavelength $\lambda_D$, by means of which light in the red spectral range having a dominant wavelength $\lambda_D$ of 605 nm was generated by filtering, in comparison with light having a dominant wavelength $\lambda_D$ of 605 nm generated by means of an unfiltered red phosphor. In this case, the square point P at approximately 605 nm represents the luminous flux $\Phi_v$ of light which was emitted by a red phosphor having an emission spectrum having a dominant wavelength $\lambda_D$ of 605 nm, and this was set to 100% as a reference value for the luminous flux $\Phi_v$. The remaining points in the form of rhombi in the diagram represent the relative efficiency $\eta_{rel}$ in relation to said reference value for various red phosphors having in each case different dominant wavelengths $\lambda_D$ that can be read on the abscissa, from the emission spectra of which light having a wavelength spectrum having a dominant wavelength $\lambda_D$ of 605 nm was generated by filtering. As can be seen, by means of filtering for the purpose of generating light having a predefined dominant wavelength $\lambda_D$, in most cases, it is possible to obtain an increase in efficiency in comparison with the use of red phosphors which have this desired dominant wavelength $\lambda_D$ without spectral filtering. However, as could already be gathered from the table from FIG. 7b, the filtering of yellow phosphor spectra is nevertheless significantly more effective than the filtering of red phosphor spectra. In this case, the increase in efficiency can be optimized even further if different doping proportions of phosphors with regard to an initial situation, e.g. for a given excitation radiation surface power density, are taken into account.

Figure 14:
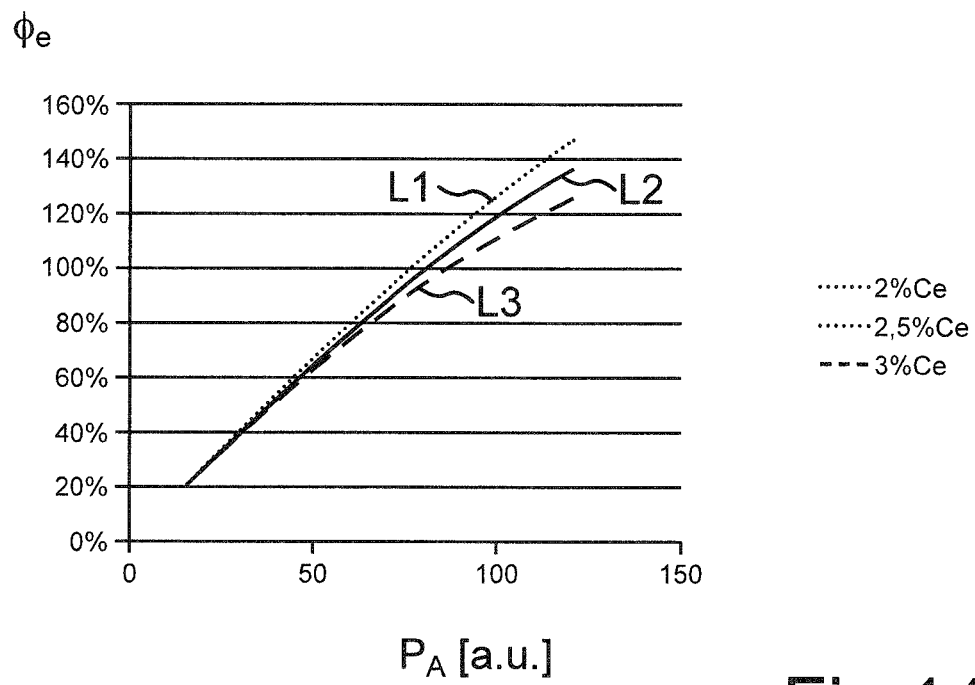
FIG. 14 shows a graphical illustration of radiation powers as a function of the excitation radiation power for a given area for the Ce:YAG yellow phosphors having the three different doping proportions.
Figure 15:
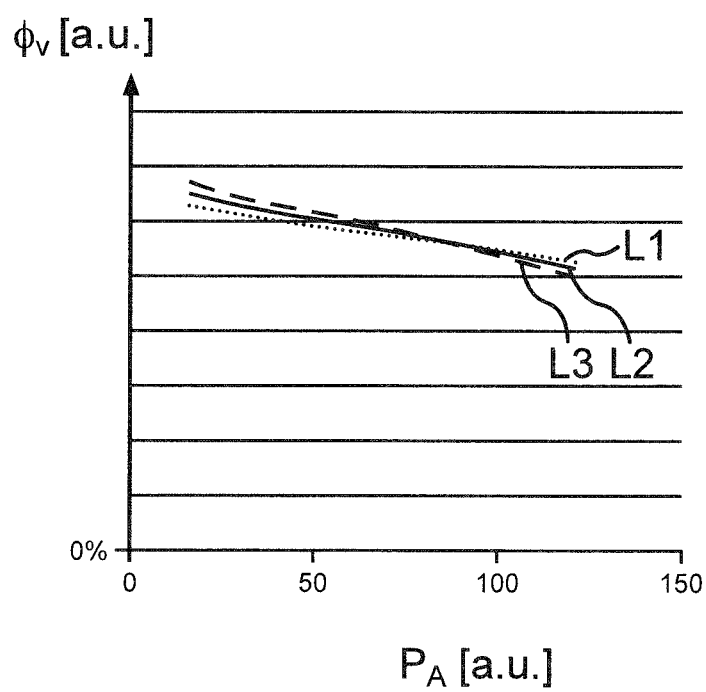
FIG. 15 shows a graphical illustration of the luminous flux as a function of the excitation radiation power for a given area for the Ce:YAG yellow phosphors having the three different doping proportions.

Reference will be made to the following figures, FIG. 12, FIG. 13, FIG. 14 and FIG. 15, to clarify the effects of different doping proportions of a phosphor L1, L2, L3 on the spectral distribution of the emission spectrum (FIG. 12), of the long-pass-filtered wavelength spectrum (FIG. 13), the quenching behavior (FIG. 14) and the resultant dependence of the luminous flux $\Phi_e$ on the excitation radiation surface power density $P_A$ (FIG. 15).

Figure 12:
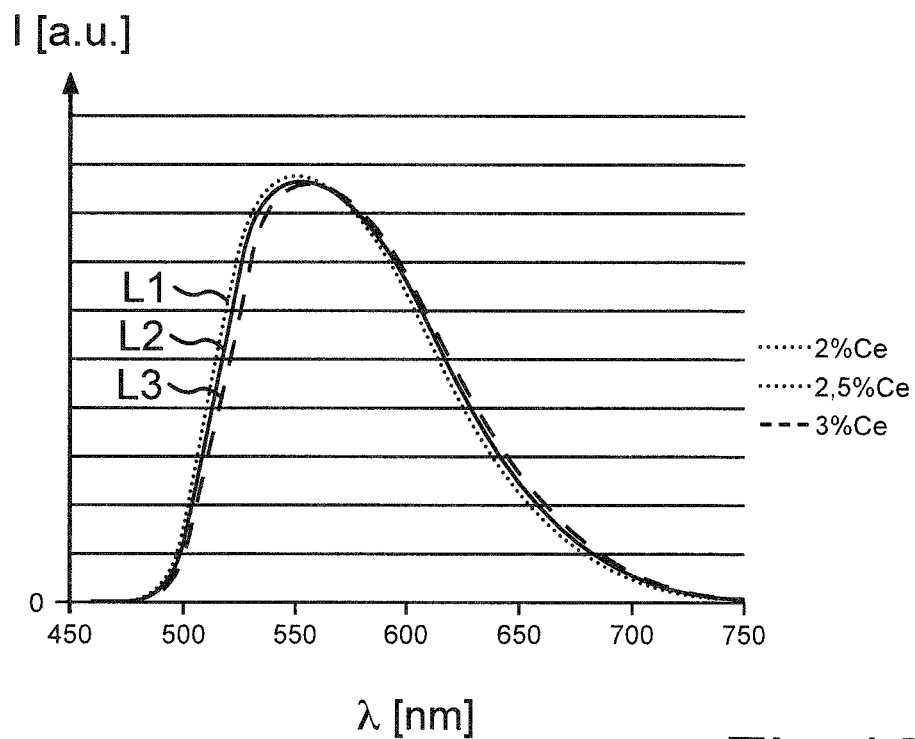
FIG. 12 shows a graphical illustration of emission spectra of Ce:YAG yellow phosphors for three different doping proportions.

FIG. 12 shows a graphical illustration of emission spectra of Ce:YAG yellow phosphors L1, L2, L3 for three different doping proportions. In this case, the ordinate of the diagram illustrated indicates the intensity I as power per wavelength in arbitrary units and the abscissa indicates the wavelength $\lambda$. In this case, the illustrated spectra of the phosphors L1, L2, L3 are normalized to an identical total power. Furthermore, these spectra of the phosphors L1, L2, L3 result in the case of an excitation radiation surface power density of approximately 2 kW/cm$^2$. In this case, the dotted curve represents the emission spectrum of a phosphor L1 having 2% Ce doping, the solid curve that of a phosphor L2 having 2.5% Ce doping and the dashed curve that of a phosphor L3 having 3% Ce doping. As can be discerned from the spectra of the phosphors L1, L2, L3, an increase in the doping proportion brings about a shift in the emission spectrum toward higher wavelengths $\lambda$. This simultaneously also results in an increase in the red component in the spectrum given an increase in the doping proportion, as illustrated in FIG. 13.

Figure 13:
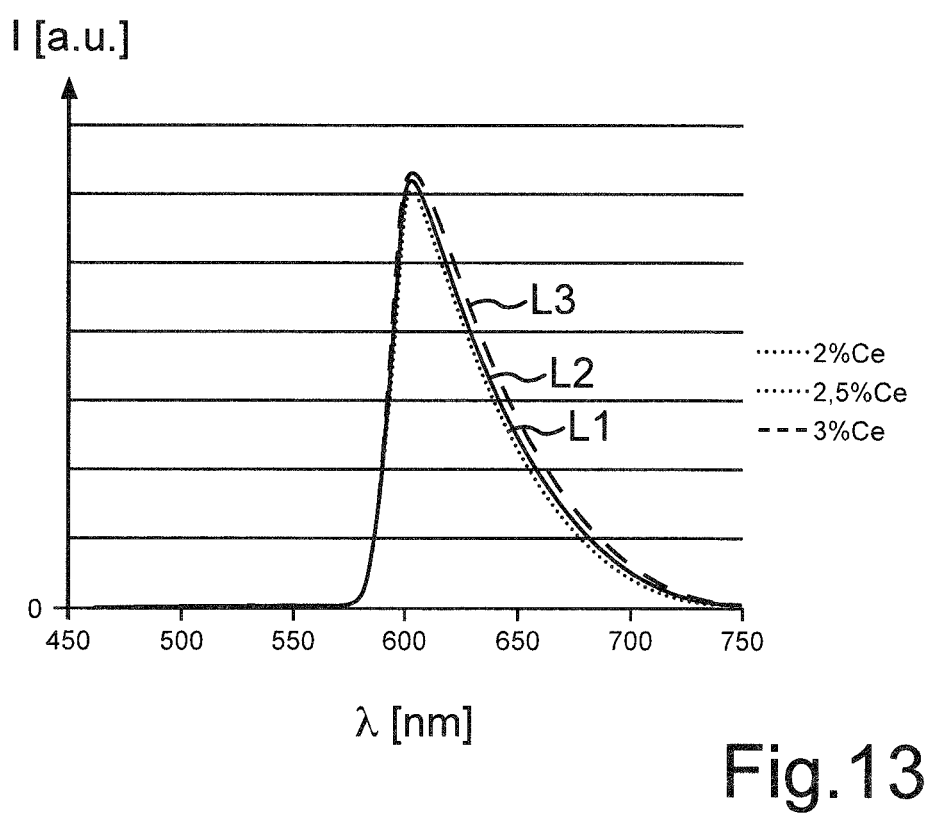
FIG. 13 shows a graphical illustration of wavelength spectra which arise as a result of long-pass filtering of the emission spectra illustrated in FIG. 12 for the yellow phosphors having the three different doping proportions.

FIG. 13 shows a graphical illustration of wavelength spectra which arise as a result of long-pass filtering of the emission spectra illustrated in FIG. 12 for the yellow phosphors L1, L2, L3 having the three different doping proportions. Here as well, the ordinate of the diagram illustrated indicates the intensity I as power per wavelength in arbitrary units and the abscissa indicates the wavelength $\lambda$. In this case, the three emission spectra in accordance with FIG. 12 were filtered by a long-pass filter having a limiting wavelength TG of approximately 590 nm and have a dominant wavelength $\lambda_D$ of approximately 605 nm. Owing to the increase in the red component in the spectrum given an increase in the doping proportion, a filtered wavelength spectrum having a higher intensity I therefore also results for a phosphor having a higher doping proportion. An effect opposite to this is quenching, however, which is manifested to a greater extent in the case of phosphors having a higher doping proportion. This will be clarified in FIG. 14.

FIG. 14 shows a graphical illustration of radiation powers $\Phi_e$ as a function of the excitation radiation power $P_A$ for a given area, i.e. excited area of the phosphor, for the Ce:YAG yellow phosphors L1, L2, L3 having the three different doping proportions. In this case, the radiation powers $\Phi_e$ of the respective phosphors L1, L2, L3 increase as the excitation radiation power $P_A$ increases, and in particular with the excited phosphor area remaining constant. In this case, it can be discerned that the increase in the radiation power $P_A$ for phosphors having a higher doping proportion is significantly less pronounced than the increase for phosphors having a lower doping proportion, which is attributable to the greater quenching in the case of higher excitation radiation surface power densities of phosphors having a higher doping proportion.

The combination of these insights explained with regard to FIG. 12-FIG. 14 can advantageously be used, then, in respect of a given application, i.e. in the case of a specific embodiment of a light module 15 in which a wavelength conversion element 18 is intended to be subjected to a specific excitation radiation surface power density, for optimally choosing the phosphor for the wavelength conversion element 18 such that the maximum luminous flux $\Phi_V$ can be provided. This will be clarified in FIG. 15.

FIG. 15 shows a graphical illustration of the luminous flux $\Phi_V$ as a function of the excitation radiation power $P_A$ for a given area for the Ce:YAG yellow phosphors L1, L2, L3 having the three different doping proportions, the emission spectra of which were long-pass-filtered and the filtered wavelength spectra of which have a dominant wavelength $\lambda_D$ of approximately 605 nm. In the case of lower excitation radiation powers $P_A$ it can be discerned that a higher luminous flux $\Phi_V$ can be provided with a phosphor having a higher doping proportion, whereas in the case of higher excitation radiation powers $P_A$ a higher luminous flux $\Phi_V$ can be provided by a phosphor having a lower doping proportion. In accordance with this assignment of the excitation radiation powers $P_A$ for a given excitation area to a value of the luminous flux $\Phi_V$ of the emission spectrum long-pass-filtered to a desired dominant wavelength $\lambda_D$ for a plurality of different doped phosphors L1, L2, L3, for a given excitation radiation surface power density it is thus possible to choose the phosphor with which the highest possible luminous flux $\Phi_V$ can be provided.

In this case, three phosphors L1, L2, L3 having different doping proportions were compared by way of example; however, it is also conceivable to compare more than three phosphors having different doping proportions and to include them in the assignment. Furthermore, it is also conceivable to make the assignment only for two phosphors having different doping proportions, for example with one phosphor having the highest possible doping proportion and one having the lowest possible doping proportion. The assignment can therefore also be provided in tabular form, e.g. in the form such that the phosphor from a plurality of phosphors having the doping proportion which results in the highest possible luminous flux is indicated in each case for a desired dominant target wavelength to be generated for an excitation radiation surface power density interval. Furthermore, in this case it is possible to provide the assignment by luminous flux measurements of a plurality of different phosphors, the emission spectra of which are filtered to a desired dominant wavelength, for given excitation radiation surface power densities.

Furthermore, the same principle also holds true for other material systems, e.g. for Eu-doped nitridic phosphors, which emit in the orange-red and the emission spectra of which likewise in the case of lower dopings are shifted toward shorter wavelengths and at the same time quench to a lesser extent.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for generating wavelength-converted light in the red spectral range having a predefinable first dominant wavelength of a wavelength spectrum by means of a wavelength conversion element, the light module comprising:
  a wavelength conversion element designed to absorb excitation radiation having at least one first wavelength, to convert it into light having at least one second wavelength greater than the first wavelength, and to emit said light;
  an excitation radiation source designed to emit excitation radiation having at least the first wavelength and arranged in such a way that excitation radiation emitted by the excitation radiation source can be radiated at least indirectly onto the wavelength conversion element;
  wherein the wavelength conversion element has an emission spectrum having a red spectral component and having a second dominant wavelength, which is less than the first dominant wavelength of the wavelength spectrum of the light to be generated at least by a predefinable value;
  wherein the wavelength conversion element is embodied in such a way that the second dominant wavelength of the emission spectrum of the wavelength conversion element lies in a yellow or yellow-green spectral range;
  wherein the light module furthermore comprises a long-pass filter arranged in such a way that light emitted by the wavelength conversion element can be radiated at least partly and at least indirectly onto the long-pass filter, wherein the long-pass filter is designed to filter the light emitted by the wavelength conversion element and radiated onto the long-pass filter in such a way that the filtered light has the wavelength spectrum of the light to be generated having the predefinable dominant wavelength.

2. The light module of claim 1,
  wherein the wavelength conversion element is embodied as a Ce:YAG phosphor, in particular with a Co doping, in order to provide a predefinable emission characteristic of the wavelength conversion element.

3. The light module of claim 1,
  wherein the excitation radiation source is designed to radiate excitation radiation having an excitation radiation surface power density of at least 1 kW/cm$^2$ onto the wavelength conversion element, and is configured in particular in such a way that the excitation radiation source radiates excitation radiation having an excitation radiation surface power density of at least 1 kW/cm$^2$ onto the wavelength conversion element during the operation of the light module.

4. The light module of claim 1,
  wherein a wavelength which is greater than 590 nm, in particular greater than 600 nm, is predefined as the predefinable first dominant wavelength.

5. The light module of claim 1, further comprising:
  a phosphor wheel, which is rotatable about a rotation axis of the phosphor wheel, wherein at least the wavelength conversion element is arranged at least in a segment of a ring-shaped region of the phosphor wheel running around the rotation axis of the phosphor wheel, wherein at least one second wavelength conversion element is arranged at least in a second segment of the region running in a ring-shaped fashion around the rotation axis of the phosphor wheel.

6. The light module of claim 5,
  wherein the phosphor wheel has a through opening in at least one third segment of the region running in a ring-shaped fashion around the rotation axis, wherein the light module is configured in such a way that excitation radiation emitted by the excitation radiation source, at least indirectly, during a rotation of the phosphor wheel, can be radiated sequentially onto each segment of the region of the phosphor wheel running in a ring-shaped fashion around the rotation axis.

7. The light module of claim 1, further comprising:

a phosphor wheel, which is rotatable about a rotation axis of the phosphor wheel, wherein the wavelength conversion element is arranged as the sole wavelength conversion element on the phosphor wheel.

8. The light module of claim 1, wherein the wavelength conversion element is arranged on a carrier, which is arranged non-movably at least relative to the excitation radiation source.

9. The light module of claim 5, wherein the phosphor wheel has a through opening in at least one third segment of the region running in a ring-shaped fashion around the rotation axis, wherein the light module is configured in such a way that excitation radiation emitted by the excitation radiation source, at least indirectly, during a rotation of the phosphor wheel, can be radiated sequentially onto each segment of the region of the phosphor wheel running in a ring-shaped fashion around the rotation axis; and wherein the light module further comprises a filter wheel comprising at least the long-pass filter, wherein the long-pass filter is arranged in at least one first region of the filter wheel, wherein the filter wheel is rotatable about a rotation axis of the filter wheel in a manner corresponding to the phosphor wheel in such a way that at least part of the light emitted by the wavelength conversion element and having the second dominant wavelength can be radiated at least indirectly onto the at least one first region of the filter wheel in which the long-pass filter is arranged.

10. The light module of claim 9, wherein the filter wheel has at least one second region in which the long-pass filter is not arranged, wherein the filter wheel is rotatable in a manner corresponding to the phosphor wheel in such a way that part of the light emitted by the wavelength conversion element and having the second dominant wavelength can be radiated at least indirectly onto the at least one second region of the filter wheel in which the long-pass filter is not arranged.

11. A method for generating wavelength-converted light in the red spectral range having a predefinable first dominant wavelength of a wavelength spectrum by means of a wavelength conversion element, the method comprising:

a) providing a wavelength conversion element, which, upon absorbing excitation radiation having at least one first wavelength, converts this into light having at least one second wavelength and emits said light, wherein the second wavelength is greater than the first wavelength;

b) radiating excitation radiation comprising radiation having the first wavelength up to the wavelength conversion element;

wherein in a) a wavelength conversion element is provided which has an emission spectrum having a second dominant wavelength, which is less than the first dominant wavelength of the wavelength spectrum of the light to be generated at least by a predefinable value, wherein the wavelength conversion element is embodied in such a way that the second dominant wavelength of the emission spectrum of the wavelength conversion element lies in a yellow or yellow-green spectral range, and has a red spectral component, wherein after b);

c) the light emitted by the wavelength conversion element is filtered at least partly by a long-pass filter in such a way that the filtered light has the wavelength spectrum of the light to be generated having the predefinable dominant wavelength.

12. A method for providing a wavelength conversion element, the method comprising:

a) predefining an excitation radiation surface power density for exciting the wavelength conversion element;

b) providing an assignment of luminous fluxes depending on excitation radiation surface power densities for a plurality of long-pass-filtered wavelength spectra having in each case an identical dominant wavelength from a plurality of phosphors having in each case different doping proportions, said phosphors being formed from a wavelength-converting basic material and being doped with doping atoms;

c) on the basis of the assignment provided in b), determining a phosphor from the plurality of phosphors which has the highest luminous flux value for the excitation radiation surface power density predefined in a); and d) providing the wavelength conversion element as the phosphor determined in c).

* * * * *